(12) United States Patent
Smith et al.

(10) Patent No.: US 7,995,058 B2
(45) Date of Patent: Aug. 9, 2011

(54) METHOD AND SYSTEM FOR IDENTIFYING ILLUMINATION FIELDS IN AN IMAGE

(75) Inventors: Casey Arthur Smith, Ithaca, NY (US); Richard Mark Friedhoff, New York, NY (US); Bruce Allen Maxwell, Springfield, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 1220 days.

(21) Appl. No.: 11/341,753

(22) Filed: Jan. 27, 2006

(65) Prior Publication Data

US 2007/0177797 A1 Aug. 2, 2007

(51) Int. Cl.
  *G06T 15/60* (2006.01)
(52) U.S. Cl. ....................................................... 345/426
(58) Field of Classification Search .................... 345/426
  See application file for complete search history.

(56) References Cited

U.S. PATENT DOCUMENTS

| | | | | |
|---|---|---|---|---|
| 6,469,706 B1* | 10/2002 | Syeda-Mahmood | .......... | 345/589 |
| 6,654,055 B1 | 11/2003 | Park et al. | ...................... | 348/242 |
| 7,305,127 B2 | 12/2007 | Wells | ............................ | 382/168 |
| 2002/0176023 A1 | 11/2002 | Hofflinger et al. | ............. | 348/645 |
| 2003/0095704 A1 | 5/2003 | Risson | ........................... | 382/162 |
| 2003/0156761 A1* | 8/2003 | Ogata et al. | ..................... | 382/251 |
| 2004/0183812 A1* | 9/2004 | Raskar et al. | ................... | 345/582 |
| 2006/0018539 A1 | 1/2006 | Sato et al. | ...................... | 382/173 |
| 2006/0177137 A1 | 8/2006 | Friedhoff et al. | ............. | 382/199 |
| 2006/0177149 A1 | 8/2006 | Friedhoff et al. | ............. | 382/274 |
| 2007/0176940 A1 | 8/2007 | Maxwell et al. | ............... | 345/589 |

OTHER PUBLICATIONS

Baba, Masashi and Naoki Asasa. "Shadow Removal From A Real Picture". 2003. Siggraph 2003. Available at http://portal.acm.org/citation.cfm?id=965488.*
Kobus Barnard and Graham Finlayson, Shadow Identification using Colour Ratios, Proceedings of the IS&T/SID Eighth Color Imaging Conference: Color Science, Systems and Applications, 2000, 97-101.
K. Barnard, G.D. Finlayson and B. Funt, *Color Constancy for Scenes with Varying Illumination*, Computer Vision and Image Understanding, 65(2): 311-321, Feb. 1997.
H.G. Barrow and J.M. Tenenbaum, *Recovering Intrinsic Scene Characteristics from Imag*, Computer Vision Systems, pp. 3-26, 1978.
C.F. Borges, *A Trichromatic Approximation Method for Surface Illumination*, Journal of Optical Society of America A, 8(8): 1319-1323., Aug. 1991.
M.S. Drew, G.D. Finlayson and S.D. Horley, *Recovery of Chromaticity Image Free from Shadows via Illumination Invariance*, Proceedings of IEEE Workshop on Color and Photometric Methods in Computer Vision, Nice, France 2003, pp. 32-39.
G.D. Finlayson, M.S. Drew and L. Cheng, *Intrinsic Images by Entropy Minimization*, Proceedings of European Conference on Computer Vision, LNCS 3023, pp. 582-595, 2004.
G.D. Finlayson, S.D. Horley and M.S. Drew, *Removing Shadows from Images*, 2002, pp. 2-14.

(Continued)

*Primary Examiner* — Aaron M Richer
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for determining an illumination field in an image. The method comprises the steps of identifying uniform and linear tokens in the image and utilizing the uniform and linear tokens to identify an illumination field.

12 Claims, 12 Drawing Sheets

Representation of Body Reflection in RGB Space

OTHER PUBLICATIONS

G.D. Finlayson, S.D. Horley and M.S. Drew, *On the Removal of Shadows from Images*, 2006, pp. 1-11.

G.D. Funklea and R. Bajcsy, *Combining Color and Geometry for the Active, Visual Recognition of Shadows*, University of Pennsylvania Department of Computer & Information Science Technical Report No. MS-CIS-94-62, 1994.

R. Gershon, A.D. Jepson and J. K. Tsotsos, *Ambient Illumination and the Determination of Material Changes*, Journal of Optical Society of America A, 3(10):1700-1707, 1986.

J.M. Geusebroek, R.v.d. Bommgard and A.W.M. Smeulders, *Color Invariance*, IEEE Trans. On Pattern Analysis and Machine Intelligence, 23(12):1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1):277-299, Dec. 1974.

G.J. Klinker, S.A. Shafer and T. Kanade, *A Physical Approach to Color Image Understanding*, International Journal of Computer Vision, 4(1): 7-38, Jan. 1990.

E.H. Land and J.J. McCann, *Lightness and Retinex Theory*, Journal of Optical Society of America A, 61:1-11, 1971.

M.S. Langer, *When Shadows Become Interreflections*, International Journal of Computer Vision, 34(2/3), 193-204, 1999.

J.A. Marchant and C.M. Onyango, *Shadow-Invariant Classification for Scenes Illuminated by Daylight*, Journal of Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Weyman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14.

Tappen et al.: "Recovering Intrinsic Images from a Single Image," IEEE Transactions on Pattern Analysis and Machine Intelligence, vol. 27, No. 9 Sep. 2005, pp. 1459-1472.

\* cited by examiner

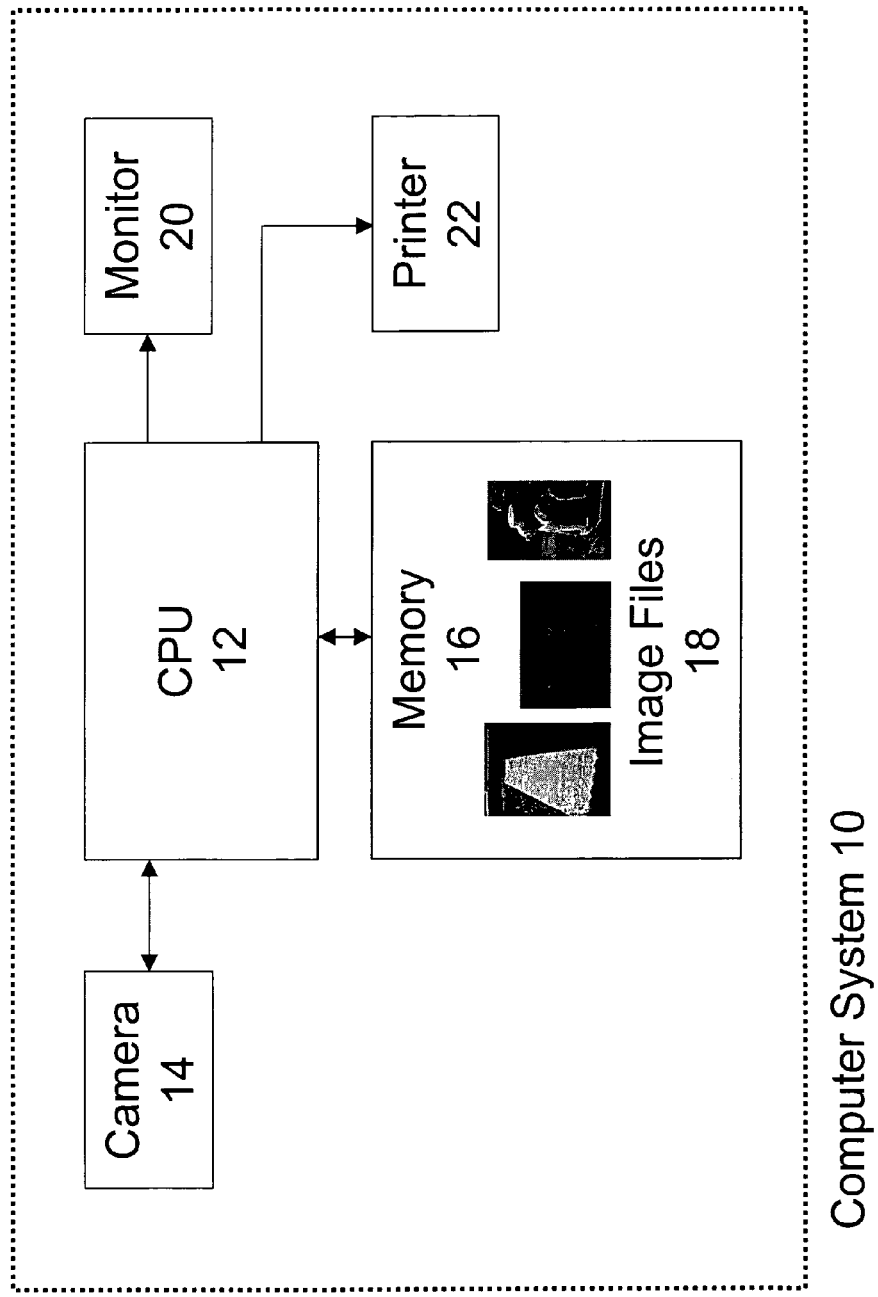
Figure 1: Computer System Configured to Operate on Images

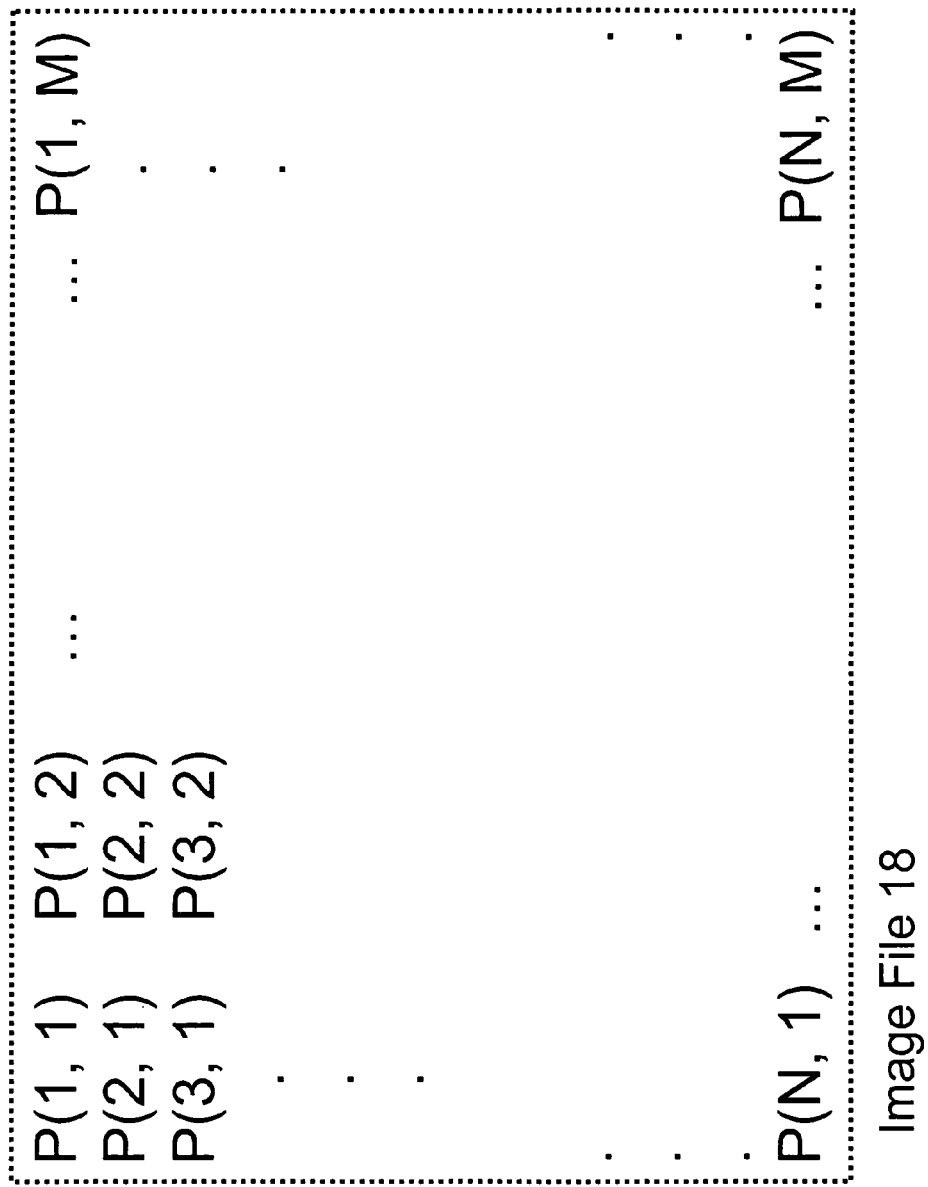

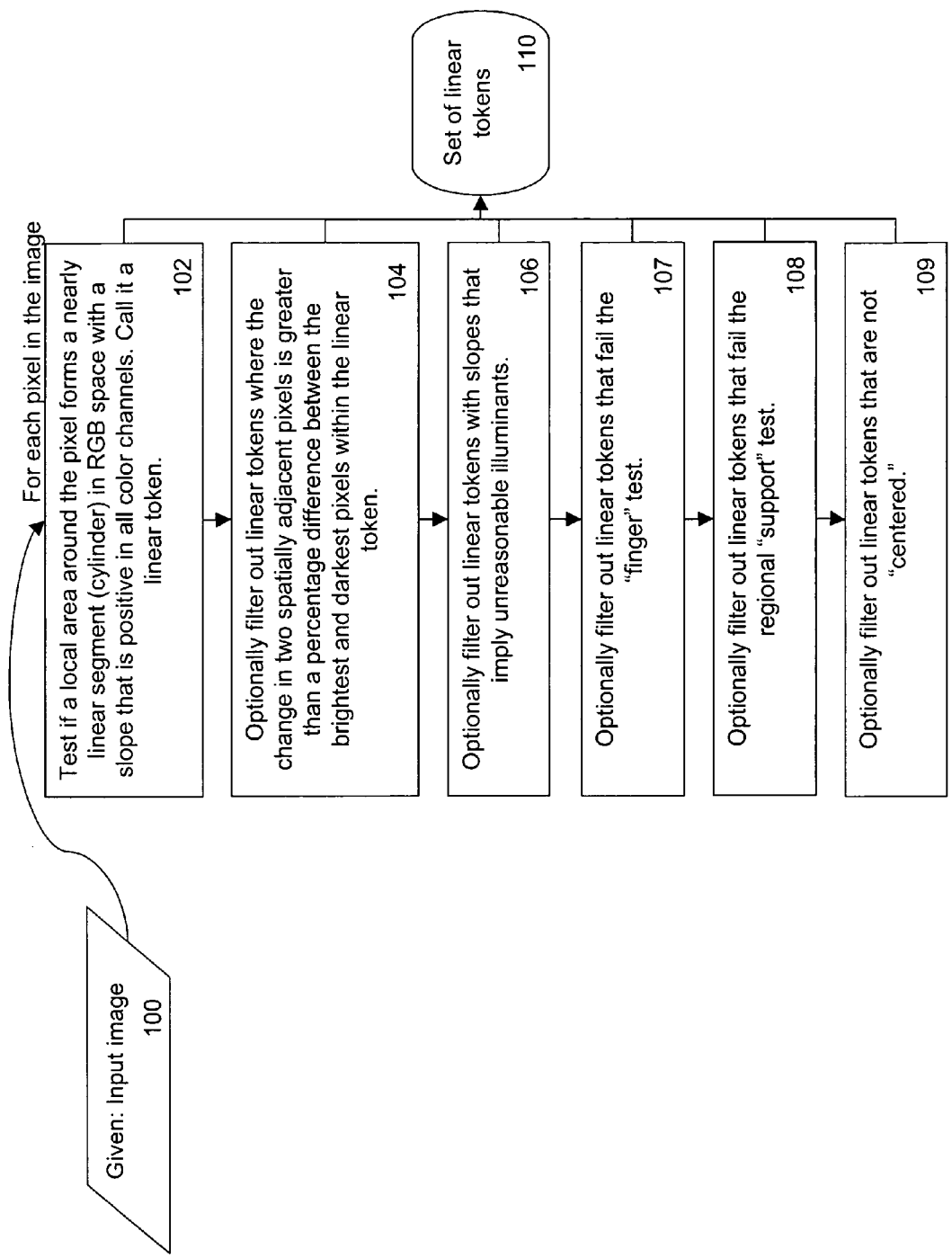
Figure 3A: Identifying Linear Tokens

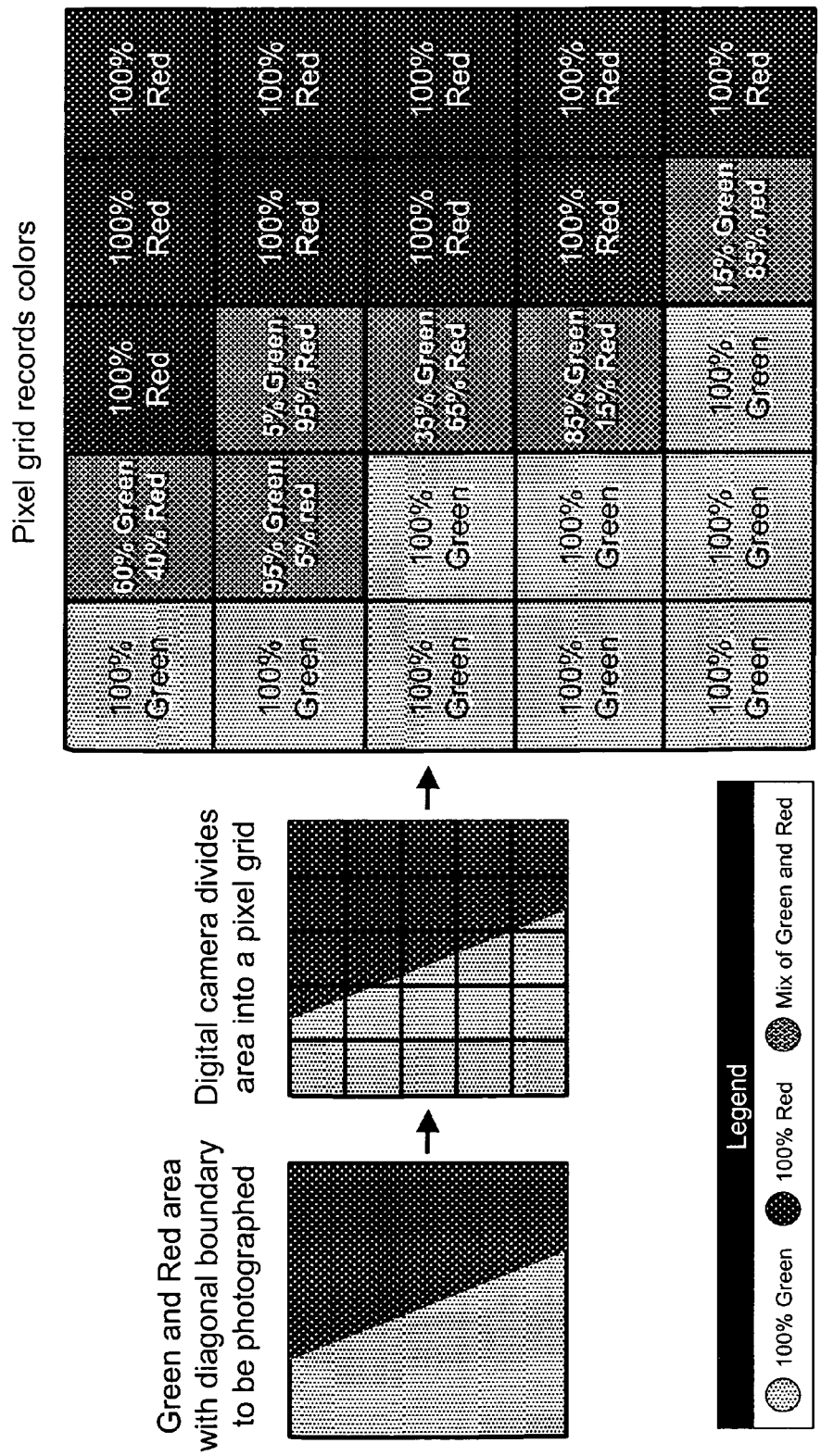
Figure 3B: Sampling Causes Fast Color Transitions on Material Boundaries

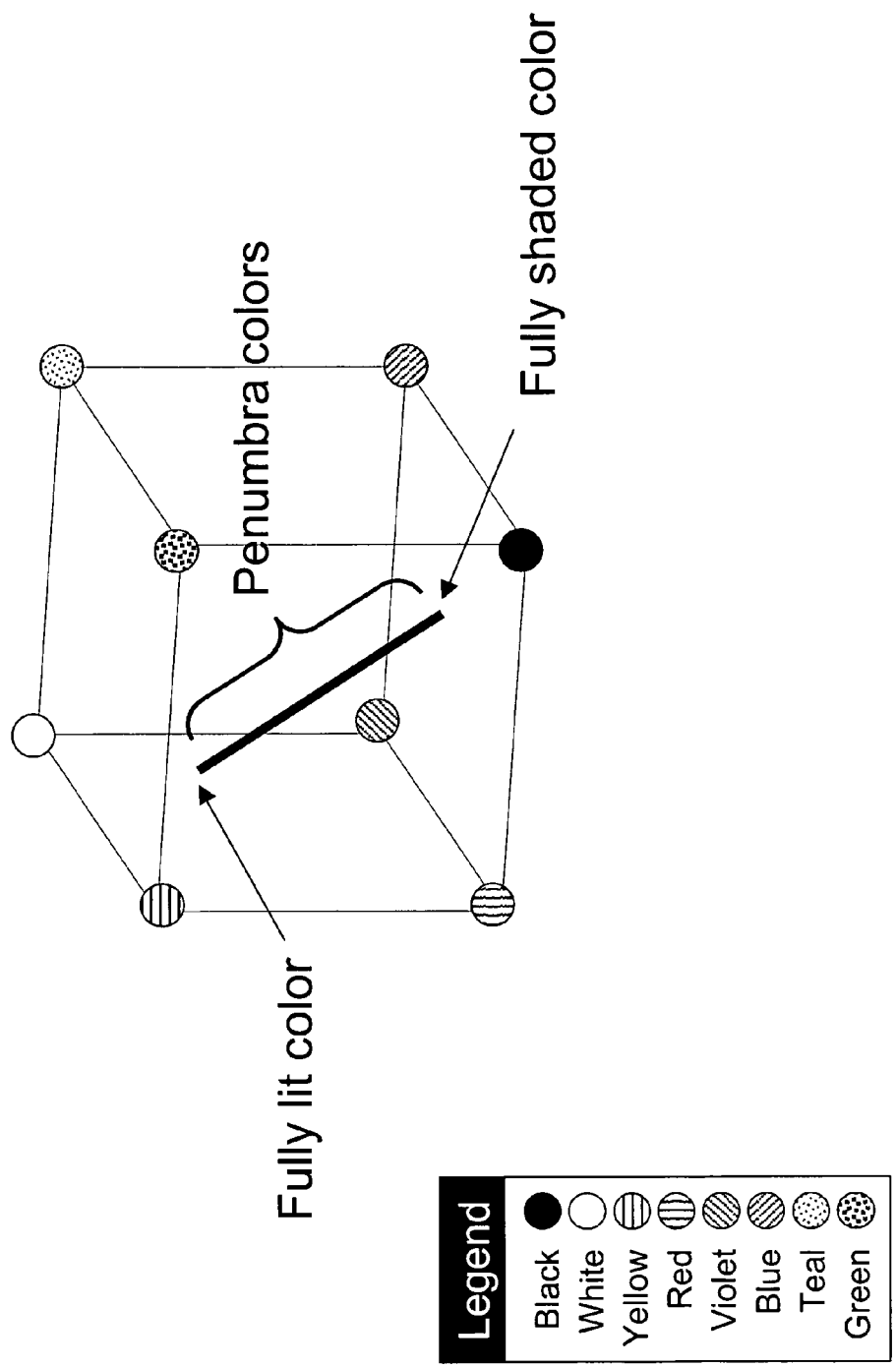
Figure 4: Representation of Body Reflection in RGB Space

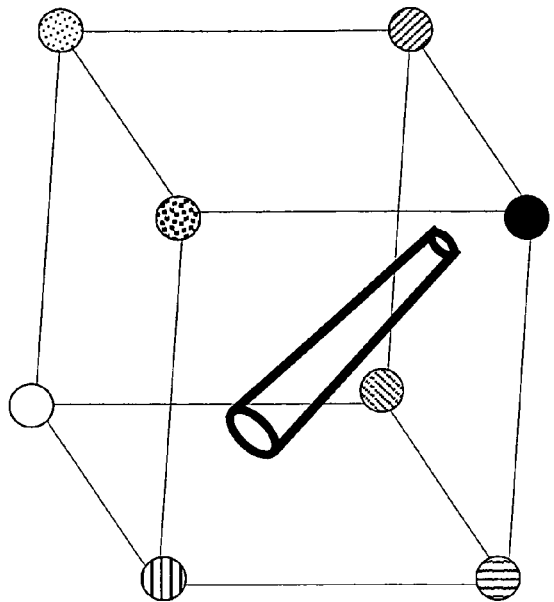
Figure 5A: Body reflection with uniform error bounds
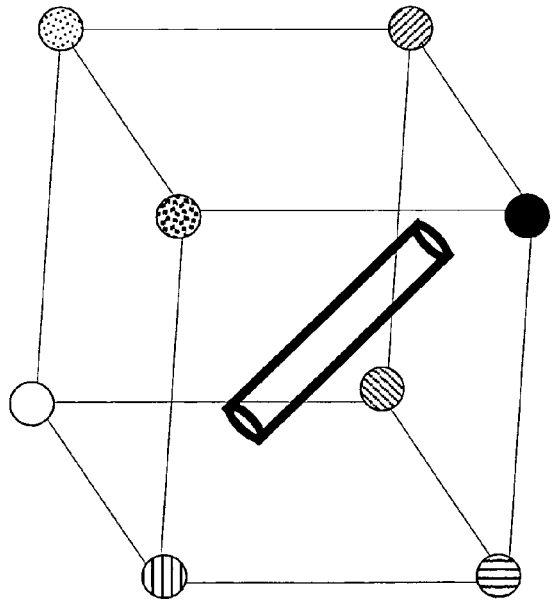
Figure 5B: Body reflection with non-uniform error bounds that are tighter at the dark end.
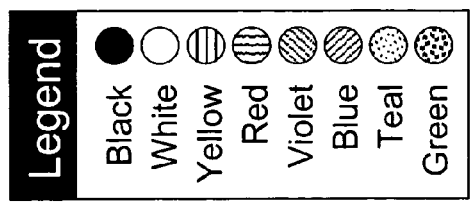
Figure 5A, 5B: Representation of Body Reflection with Noise

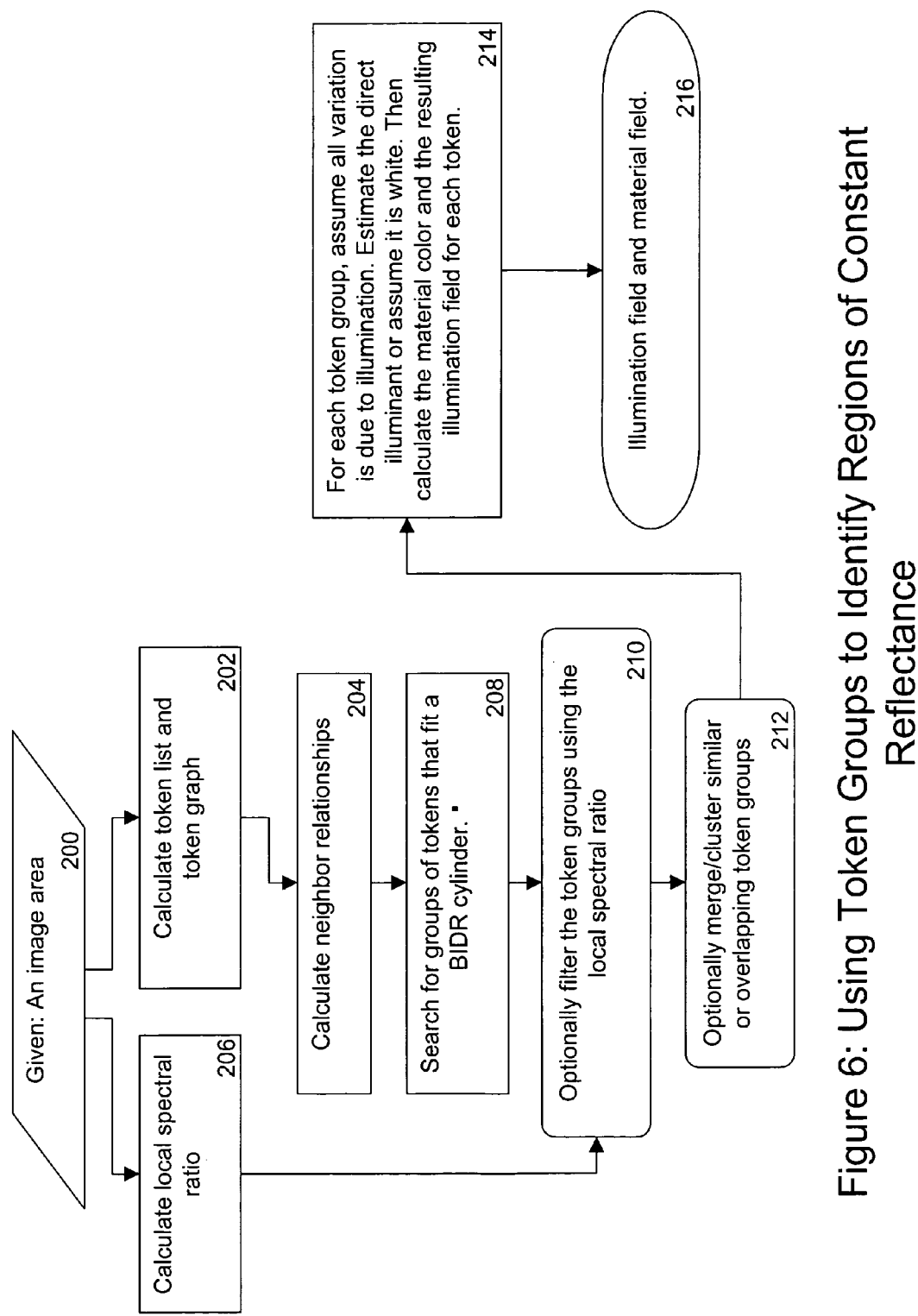
Figure 6: Using Token Groups to Identify Regions of Constant Reflectance

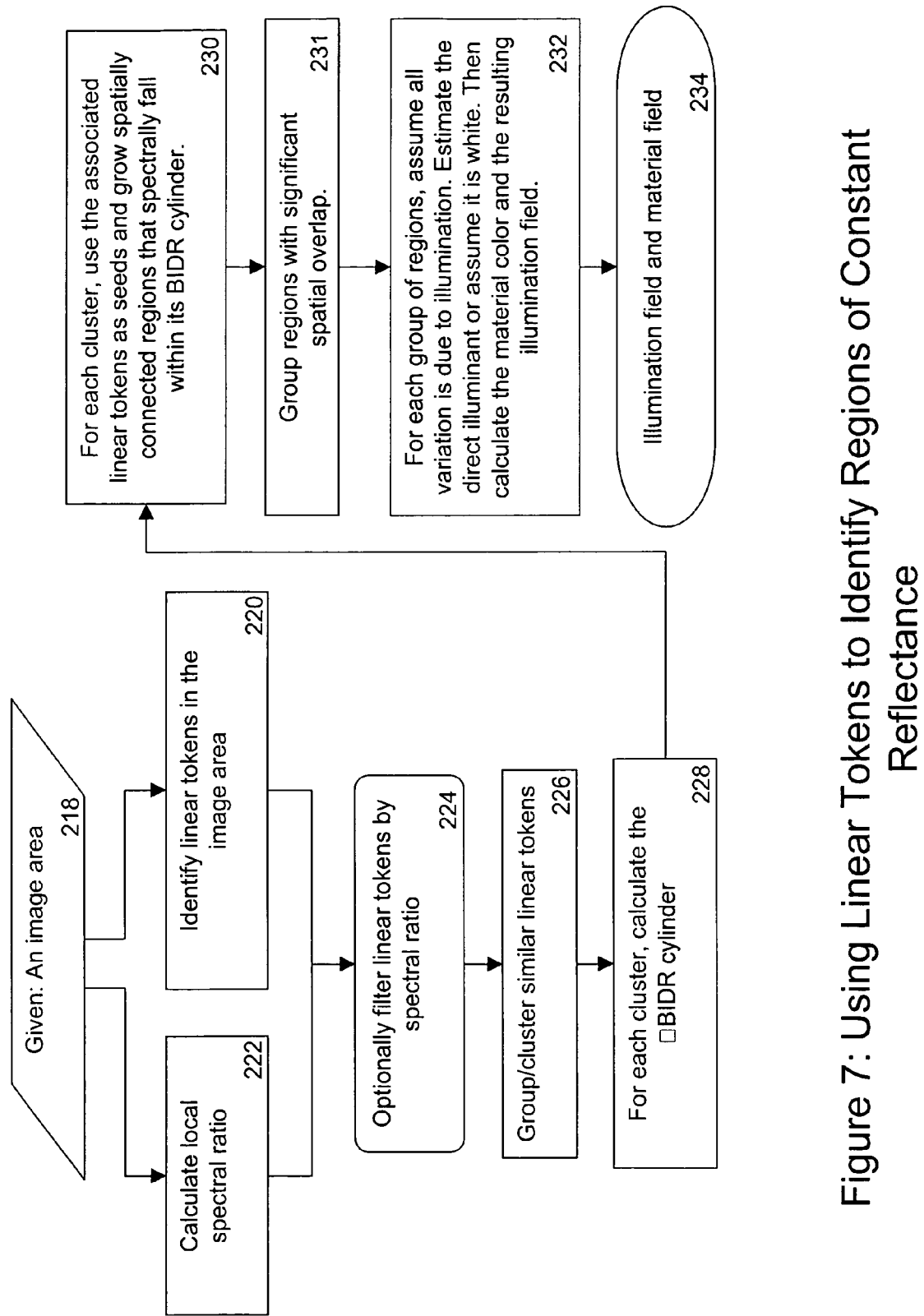
Figure 7: Using Linear Tokens to Identify Regions of Constant Reflectance

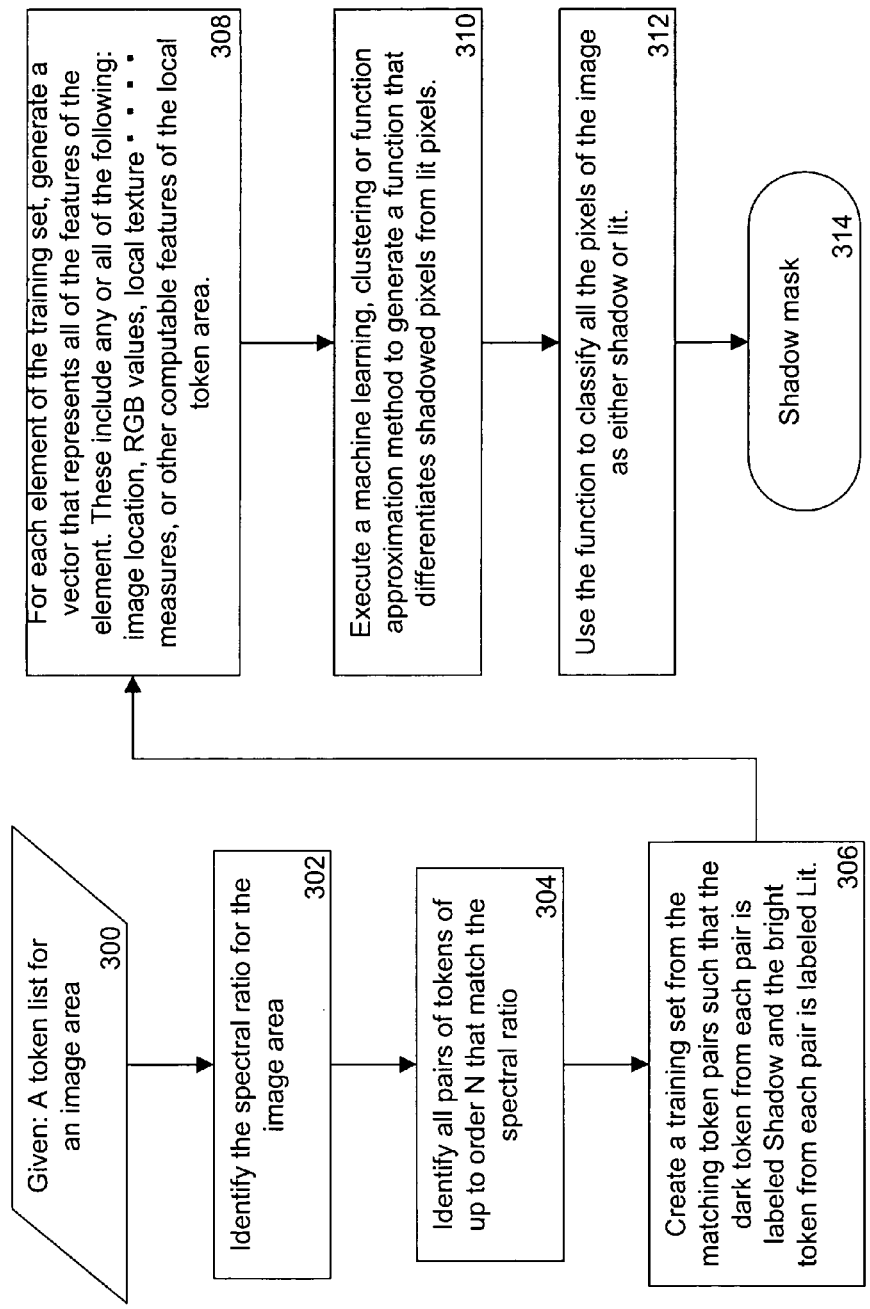
Figure 8: Training a Shadow/Lit Classifier Using Nth-order Tokens

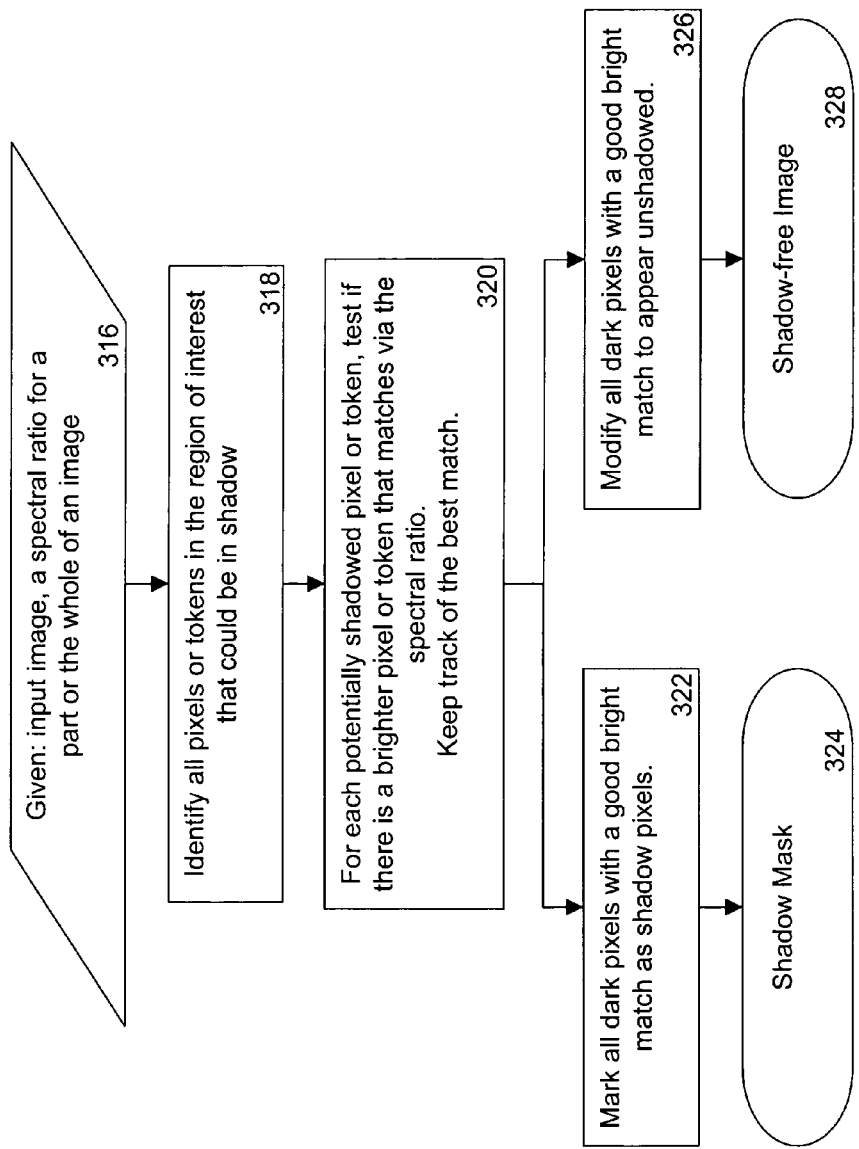
Figure 9: Identifying and Modifying Shadowed Areas Using Ratio Labeling

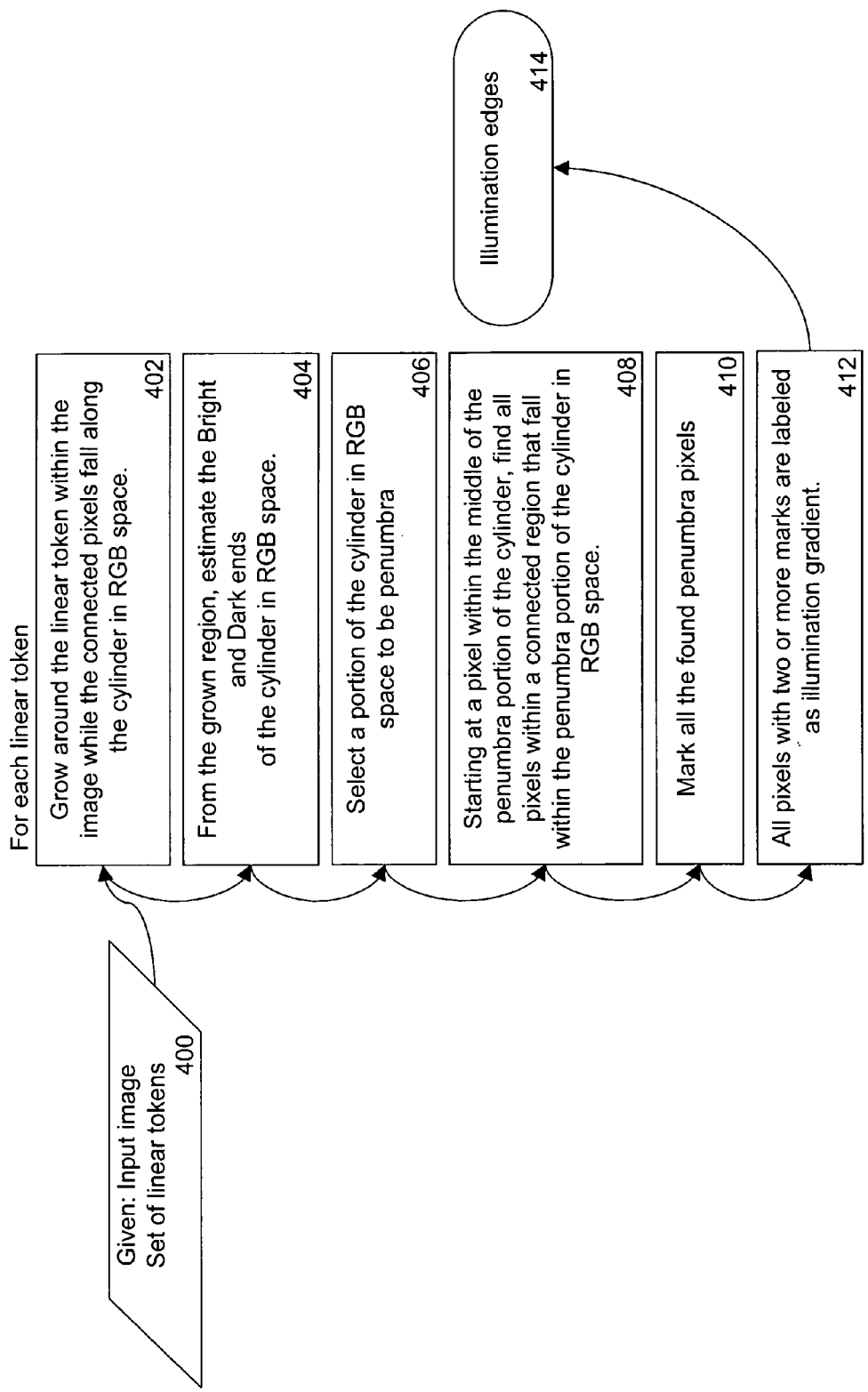
Figure 10: Identifying Illumination Gradients

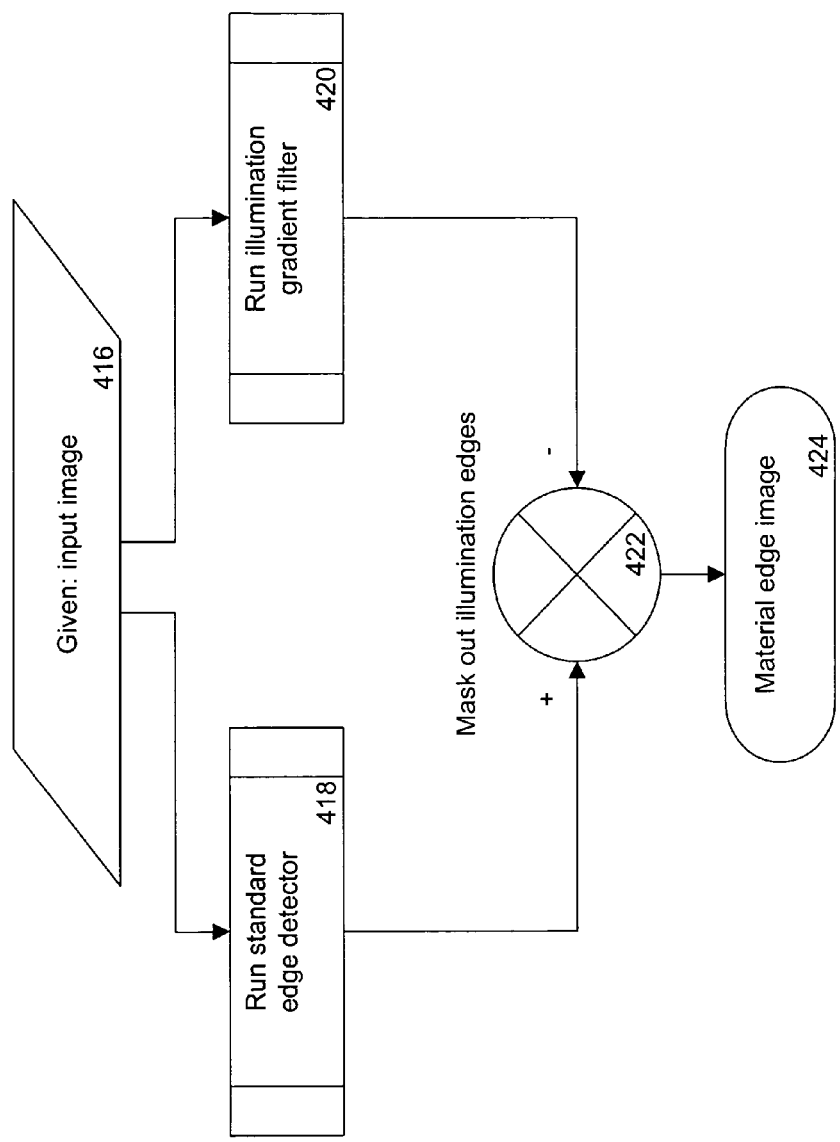
Figure 11: Identifying Material Edges

METHOD AND SYSTEM FOR IDENTIFYING ILLUMINATION FIELDS IN AN IMAGE

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. Edge detection is a fundamental task in image processing because without accurate and correct detection of the edges of physical objects, no other processing of the image is possible. If a cast shadow is indistinguishable from the object casting the shadow, it would not be possible for the computer to recognize the object.

An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images.

SUMMARY OF THE INVENTION

The present invention provides a method and system comprising image techniques that accurately and correctly reflect and represent physical phenomena occurring in the visual world, for identification of illumination fields in an image.

In a first exemplary embodiment of the present invention, an automated, computerized method is provided for determining an illumination field in an image. The method comprises the steps of identifying linear tokens in the image and utilizing the linear tokens to identify an illumination field.

In a second exemplary embodiment of the present invention, an automated, computerized method is provided for determining shadow/lit pixels of an image. The method comprises the steps of identifying uniform tokens in the image and utilizing the uniform tokens to identify shadow/lit pixels of the image.

In a third exemplary embodiment of the present invention, an automated, computerized method is provided for determining a shadow in an image. The method comprises the steps of calculating a characteristic spectral ratio for the image, and utilizing the characteristic spectral ratio to identify a shadow in the image.

In a fourth exemplary embodiment of the present invention, an automated, computerized method is provided for determining a material edge in an image. The method comprises the steps of calculating an illumination gradient for the image and utilizing the illumination gradient to identify a material edge in the image.

In a fifth exemplary embodiment of the present invention, an automated, computerized method is provided for determining an illumination field in an image. The method comprises the steps of identifying tokens in the image, clustering the identified tokens into groups and utilizing the token groups to identify an illumination field.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

FIG. 3a is a flow chart for identifying linear tokens in an image according to a feature of the present invention.

FIG. 3b shows an image at a material boundary, and pixel values at the boundary.

FIG. 4 is a graph in RGB color space showing colors for a material, from a fully shaded color value to a fully lit color value, as determined by execution of a simplified bi-illuminant dichromatic reflection model according to a feature of the present invention.

FIGS. 5a & b are graphs in RGB color space showing colors for a material, from a fully shaded color value to a fully lit color value, with error bounds forming a cylinder, as determined by execution of the bi-illuminant dichromatic reflection model according to a feature of the present invention.

FIG. 6 is a flow chart for using token groups to identify regions of consistent reflectance of an image, according to a feature of the present invention.

FIG. 7 is a flow chart for using linear tokens to identify regions of consistent reflectance of an image, according to a feature of the present invention.

FIG. 8 is a flow chart for using Nth order tokens to identify shadowed and lit regions of an image, according to a feature of the present invention.

FIG. 9 is a flow chart for using ratio labeling to identify and correct shadowed areas of an image, according to a feature of the present invention.

FIG. 10 is a flow chart for identifying illumination gradients in an image, according to a feature of the present invention.

FIG. 11 is a flow chart for identifying material edges in an image using illumination gradients, according to a feature of the present invention.

DETAILED DESCRIPTION OF THE PREFERRED EMBODIMENTS

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU can be implemented as a microprocessor embedded in a device such as, for example, the digital camera 14 or a robot. The CPU can also be equipped with a real time operating system for real time operations relating to images, for example, in connection with a robotic operation or an interactive operation with a user.

As shown in FIG. 2, each image file 18 comprises an n X m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The present invention can also be utilized in connection with a grayscale image (a single band). The pixel array includes m columns of n rows each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, identification of regions of consistent reflectance within an image, to identify a single material of an object. A fundamental observation underlying a basic discovery of the present invention, is that an image comprises two components, material and illumination. All changes in an image are caused by one or the other of these components. What is visible to the human eye upon display on the monitor 20 of a stored image file 18 by the CPU 12, is the pixel color values caused by the interaction between specular and body reflection properties of material objects in, for example, a scene photographed by the digital camera 14 and illumination flux within an illumination field present at the time the photograph was taken. The illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region.

The computer system 10 can be operated to differentiate between material aspects and illumination flux through recognition of a spectral shift caused by an interplay between the incident or direct illuminant and the ambient illuminant in the illumination field. When one of material and illumination is known in an image, the other can be readily deduced. The spectrum for the incident illuminant and the ambient illuminant can be different from one another. Indeed, the spectrum of the ambient illuminant may change throughout the scene due to interreflection effects. In the absence of interreflection, a spectral shift caused by a shadow, i.e., a decrease of the intensity of the incident illuminant, will be invariant over different materials present in a scene depicted in an image.

According to a feature of the present invention, a token analysis can be used to identify areas of consistent reflectance within an image, to thereby identify a single material of an object. A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image. For purposes of describing, identifying and using linear tokens, the BIDR model can be stated as: $I_{(x, y, z, \theta, \phi, \lambda)} = c_b(\lambda) l_d(\lambda) \gamma_b + M_a(\lambda) c_b(\lambda)$, where: $I_{(x, y, z, \theta, \phi, \lambda)}$ is the radiance of a surface point at (x, y, z) in the direction $\theta$, $\phi$ for the wavelength $\lambda$, $c_b(\lambda)$ is the geometry independent body reflectance of a surface for the wavelength $\lambda$, $l_d(\lambda)$ is the incident illuminant for the wavelength $\lambda$. $\gamma_b$ is the product of a shadow factor $s_{x, y, z}$ and a geometric factor $m_b(\theta i)$, and $M_a(\lambda)$ is the integral of the ambient illuminant and geometric body reflectance over a hemisphere, excluding the incident illuminant For a more detailed discussion of the BIDR model reference is made to co-pending application Ser. No. 11/341,751, filed on even date herewith, entitled: "Bi-illuminant Dichromatic Reflection Model For Image Manipulation," now published as US 2007/0176940 on Aug. 2, 2007, which is hereby incorporated by reference.

Referring now to FIG. 3a, there is shown a flow chart for identifying linear tokens in an image. In step 100, the CPU 12 is given an image file 18, for processing. The CPU 12 tests each pixel in the image for identification of linear tokens. In step 102, for a current pixel, the CPU 12 tests a local area around the current pixel to determine whether the current pixel and its neighboring pixels fall within a linear segment or cylinder in RGB space (BIDR cylinder), as predicted by the BIDR model. FIG. 4 shows a graph in RGB color space for colors for a single material, from a fully shaded color value to a fully lit color value, as determined by execution of a simplified bi-illuminant dichromatic reflection model from $\gamma_b = 0$ (fully shaded) to $\gamma_b = 1$ (fully lit), according to a feature of the present invention. As shown in FIG. 4, the BIDR model predicts that all of the measured colors of a particular material in shadow, light and penumbra extend along a line in RGB space (the cube shown in FIG. 4).

In practice, a camera or other sensor used to record an image typically has noise, and no material in an image is of a completely uniform color. Accordingly, the appearance values of the surface fall within a cylinder having a width determined by variation in material and imaging sensor noise characteristics. The cylinder representing body reflection, according to the incident and ambient illuminants considered in the BIDR model of the present invention, has a unique starting place for every intrinsic color in the scene. The starting point is determined by the product of the ambient illumination and the body color, and the slope of the cylinder in RGB space is determined by the product of the incident illumination and the body color.

FIGS. 5a & b are graphs in RGB color space showing colors for a material, from a fully shaded color value to a fully lit color value, with error bounds forming a cylinder. In FIG. 5a, a cylinder is shown around the RGB line predicted by the BIDR model, with the dimensions of the cylinder diameter being a function of the noise of the recording device used to record the image, and variations.

FIG. 5b, illustrates a cone shaped cylinder in recognition that the same absolute distance at the fully shadowed end represents a greater actual color difference than the same absolute distance from the line at the fully lit end of the line. This is due to the fact that the magnitude of the color band intensities at the shadow end are a greater percentage of the actual distance from the line in the shadow end than at the lit end. For example, consider a color at the shadow end of the cylinder of (RGB)=(5, 6, 8) and a color at the lit end of (100, 120, 160). If the CPU 12 modifies the color value for each 10 units toward the color red from both color values, the result is a shadow color value of (15, 6, 8) and a lit color of (10, 120, 160). At the dark end, the color shifted from a distinctly blue color to a distinctly red color, while at the lit end the color remains blue. In order to compensate for the difference, an adjustment is made to the cylinder to be narrower at the shadow end and wider at the lit end such that a same magnitude of color change will have a correspondingly accurate absolute distance from the line.

If the set of neighboring pixels define a cylinder in RGB space, as shown in, for example, FIG. 5b, the CPU 12 designates the set of pixels as a linear token because, as predicted by the BIDR model, such a set of pixel color values may be due to a change in the amount of incident illuminant due to a cast shadow or a scene geometry changing on a single material. However, such a cylinder can be caused be caused by a transition from one material to another under constant illumination. A cylinder caused by a transition from one material to another will be identified through execution of a number of filtering steps, as will be described below. The CPU 12 repeats step 102 for each pixel in the image to identify a set of linear tokens in the image.

Steps 104, 106, 107, 108, 109 are optional filters the CPU 12 can implement to verify that the set of linear tokens identified in step 102, are indeed due to a shadow across a single material. In step 104, the CPU 12 optionally filters out each identified linear token where the change between two spatially adjacent pixels is greater than a selected percentage of the difference between the brightest pixel and the darkest pixel in the linear token. A shadow penumbra generally exhibits a gradual change from darkest to brightest, so the percentage change between any two spatially adjacent pixels within the penumbra should be relatively small. In contrast, a transition between two materials in a sharply focused image is often very rapid, occurring in the space of 1, 2, or 3 pixels.

In step 106, the CPU 12 optionally filters out linear tokens with a slope implying an unreasonable illuminant. The ambient illuminant can be measured by a spectral ratio, S=D/(B−D), where D represents a dark pixel and B a bright pixel of a pixel pair in the image. A spectral ratio is a ratio based upon a difference in color or intensities between two areas of a scene depicted in an image, which may be caused by different materials, an illumination change or both.

An automated, computerized method for determining a characteristic spectral or illuminant ratio due to illumination flux, for an image, is disclosed in co-pending application Ser. No. 11/341,742, filed on even date herewith, entitled: "Method and System For Identifying Illumination Flux In An Image," now published as US 2006/0177149, on Aug. 10,2006, which is hereby incorporated by reference.

When stating the spectral ratio, S=D/(B−D), in terms of the BIDR model, $S=M_a(\lambda)c_b(\lambda)/([c_b(\lambda)l_d(\lambda)\gamma_b+M_a(\lambda)c_b(\lambda)]-M_a(\lambda)c_b(\lambda))$, where $\lambda$ represent the set of color bands in the image. This equation reduces to $S=M_a(\lambda)/l_d(\lambda)\gamma_b$. Inasmuch as $\gamma_b$ is scalar, the relative proportions of different color bands in the spectral ratio, for example, RGB values, are constant. Thus, for a given pair of direct and ambient illuminants in an image, the normalized spectral ratio is constant for all bright and dark pixel pairs that correspond to the same material when D is assumed to have a $\gamma_b=0$, and the bright pixel, B, is receiving some incident illuminant. The spectral ratio is therefore a representation of image properties and characteristics that, according to the BIDR model, can be utilized as a basis for manipulation of pixel values for a color correct adjustment, for example, as a prediction of color adjustments that fall within a color correct cylinder as illustrated in FIG. 5b.

Empirical observations indicate that a most saturated ambient illuminant will have a ratio of no greater than, for example, 0.8. Any value greater than 0.8 indicates that the color change in unlikely to be caused solely by illumination, but caused by a strictly material change or a combination of material and illumination change. Thus, identified linear tokens with a ratio greater than, for example, 0.8, will be filtered out of the identified linear tokens. The saturation threshold can be adjusted, based upon the accuracy of the measurements used to ascertain the ratio.

In step 107, the CPU 12 optionally filters out linear tokens that fail a "finger" test. Finger filtering involves an analysis of pixel color values for pixels perpendicular to the overall local image gradient measured by the linear token to determine whether nearly constant color values appear in either direction. Rather than sampling the color at a point in a scene, a pixel instead measures the average color over some small area. Material boundaries tend to be sharp, and at a sharp boundary between two materials, a pixel will likely overlap some portion of the two materials, and the color of the pixel will depend on the proportion of the two materials. As the analysis moves along a material boundary, adjacent pixels along the boundary will likely have different proportions of the two materials and thus different colors. FIG. 3b illustrates this property. In an illumination boundary, when the analysis moves perpendicularly to the image gradient captured by the linear token, colors usually remain nearly constant since illumination transitions are typically more attenuated than material transitions.

Pursuant to a feature of the present invention, the finger test comprises an analysis of each pixel along the perimeter of a linear token. First the direction of the major image gradient captured by the linear token is measured. Then, for each perimeter pixel on the linear token, the CPU 12 records the color of the pixel. Thereafter, the CPU 12 examines pixels in a direction approximately perpendicular to the measured image gradient, allowing some variation, for example, 45 degrees in either direction away from perpendicular. If any of the pixels in the approximately perpendicular direction is approximately the same color as the subject perimeter pixel, the CPU 12 moves the focus of the analysis to that pixel. From the newly focused pixel, the analysis is continued, and the steps are repeated until a preselected number of generally perpendicular pixels of the same color as the original perimeter pixel are identified (to establish a finger). The routine is repeated for each perimeter pixel of the linear token. If all of the perimeter pixels have fingers of the predetermined length, the linear token is accepted. In this regard, any fingers that are perfectly horizontal, vertical, or diagonal may be due to a chance alignment between the sensor grid of pixels and a material boundary. Thus a linear token with any perfectly horizontal, vertical, or diagonal fingers may be rejected or given a low confidence score.

Linear tokens occur in locations where either the illumination or material is changing. When the change is due to repeatedly varying illumination, such as on a rippled surface or mottled illumination from shadows cast by leaves, then the population of linear tokens on the brighter end of a ripple will be similar to the linear tokens on the darker end. Therefore, a linear token A that is in the middle of a ripple will have similar populations of linear tokens on its bright and dark ends. On the other hand, a linear token that crosses a material boundary will not, in general, have similar populations of linear tokens at either end. Instead, one population would correspond to one material, while the population at the other end of the token would correspond to the second material. In step 108, the CPU 12 uses support filtering to use the material difference to filter out linear tokens that cross material boundaries.

To that end, consider a linear token A in an image. The set of tokens that are close to one end of A in the image but that do not cross the same area of the image as A become population B. The set of tokens close to the other end of A in the image but that do not cross the same area as A become population C. The areas defining populations B and C can be calculated using a mask or using distance and orientation relative to an end of the linear token A. It is also possible to use more than one mask—since boundaries can be curved or may not align perpendicularly to the linear token A—and then use the output of all of the masks to make a filtering decision.

Thereafter, the CPU 12 operates to characterize and compare populations B and C. One method of characterization is to use a mean shift algorithm or other method known in the art, such as the RANSAC algorithm, to identify the slope and intercept in RGB space that fits the largest plurality of linear tokens in the population. Once characterized, if populations B and C have similar slopes and intercepts as each other and have similar slopes and intercepts to linear token A, then linear token A is said to have supporting regions to either side. Linear tokens without supporting regions to either side may be filtered out as potential material boundaries.

In step 109, linear tokens may be optionally filtered by the location of the sharpest edge within the linear token. The difference in RGB space between all adjacent pixels within a linear token is measured. If this largest difference occurs near the middle of the linear token, the linear token is said to be centered, and it passes the filtering. Filtering for centered tokens makes support filtering more effective.

Upon completion of the filtering operations of steps 102, 104, 106, 107, 108, 109, the CPU 12 outputs a set or group of linear tokens for the image (step 110).

FIG. 6 shows a flow chart for using token groups to identify regions of consistent reflectance. In step 200, the CPU 12 is given an image area from an image file 18. In step 202, the CPU 12 calculates a token list and token graph. The token list generation can include identification of uniform tokens, as taught in the co-pending application Ser. No. 11/341,742, filed on even date herewith, entitled: "Method and System For Identifying Illumination Flux In An Image," in addition to linear tokens, identified through execution of the routine of FIG. 3a, as discussed above. A token graph is a graph showing neighbor relationships among tokens identified by the CPU 12, for example, all tokens within 20 pixels of a subject token. The graph can be used to identify similar tokens that are neighbors of a subject token, since groups of tokens can extend along the length of a shadow or across an undulating surface. A method for generating a token graph is disclosed in the co-pending application Ser. No. 11/341,742, filed on even date herewith, entitled: "Method and System For Identifying Illumination Flux In An Image."

Upon completion of step 202, the CPU 12 examines all pairs of neighbors in the token graph to evaluate whether the change between the neighboring tokens is caused by an illumination change (step 204). The examination comprises a set of tests. In a first test, the CPU 12 determines whether one token neighbor is darker than the other in all color bands.

In a second test, the CPU 12 determines whether a line connecting the brighter token color to the darker token color comes close to the origin of the color space depicting the token colors. The CPU 12 evaluates the closeness relationship by calculating the angle between a line connecting the origin with the darker token color value and the line connecting the two token color values. If the angle is greater than a threshold, for example, 10 degrees, the change between the two tokens is deemed to be a material change. This test is similar to the spectral ratio saturation filter discussed above.

In a third test, the CPU 12 determines whether the reflectance ratio, $R_i=(A_i-B_i)/(A_i+B_i)$, along pairs of border pixels between two regions have little variance, and is close to 0 (within noise tolerances).

Upon completion of step 204, the CPU 12 searches the token list for groups of tokens (step 208) where neighboring tokens are linked by possible illumination changes, as determined in step 204, and the color values of the tokens define a cylinder in RGB space (a BIDR cylinder). The groups of tokens can be organized according to the neighbor relationships indicated in the token graph. In parallel, the CPU can calculate a set of local characteristic spectral ratios for the image (step 206). Inasmuch as an illumination boundary is caused by the interplay between the incident illuminant and the ambient illuminant, as discussed above, spectral ratios throughout the image that are associated with illumination change, should be consistently and approximately equal, regardless of the color of the bright side or the material characteristics of the boundary. Thus, if a spectral ratio in our analysis of token groups is approximately equal to characteristic spectral ratio for the scene, that is an indication that the changing color values between the tokens are in fact caused by illumination.

As taught in the co-pending application Ser. No. 11/341, 742, filed on even date herewith, entitled: "Method and System For Identifying Illumination Flux In An Image," in order to improve the accuracy and correctness of the characteristic ratio for an image, the spectral ratio information for illumination boundaries is determined on a local level, that is, an illuminant ratio is determined for each of several preselected local areas of a scene depicted in an image. An analysis of a boundary is then executed utilizing the spectral ratio for the specific location of the boundary within the image.

The determination of locally relevant spectral ratios accommodates complexities that may be encountered in a real world image, for example, the interplay of several different sources of light in a room, inter-reflections, and so on. According to the teachings of the co-pending application, a local spectral ratio is automatically determined by the computer system 10, by a dynamic sampling of local areas of the image, to identify spatio-spectral features of an image, that is, features that comprise conditions that are indicative of illumination flux.

As noted above, the spectral ratio is S=D/(B−D). In step 210, the CPU 12 can calculate a spectral ratio for the pixels of each of the identified token groups. A token group comprises a collection of spatially adjacent tokens which all lie on an RGB cylinder. The Bright and Dark colors for the ratio are the colors of the brightest and darkest token in the token group. If the spectral ratio for the token group is significantly different from the characteristic spectral ratio for the location of the tokens, then the RGB cylinder represented by the token group may not correspond solely to an illumination change, so the group may be rejected.

In step 212, the CPU 12 optionally clusters and merges similar token groups. For the purpose of clustering, the CPU defines the distance between two tokens as d=Euclidean distance between the slopes of two BIDR cylinders+0.5*(distance from cylinder 1 Bright end pixel to cylinder 2 axis+ distance from cylinder 1 Dark end pixel to cylinder 2 axis+ distance from cylinder 2 Bright end pixel to cylinder 1 axis+ distance from cylinder 2 Dark end pixel to cylinder 1 axis)+ 0.5*(|cylinder 1 bright location−cylinder 2 bright location|+ |cylinder 1 dark location+cylinder 2 dark location|). The CPU then executes one of any clustering algorithms well-known in the art such as leader-follower (online) clustering or hierarchical agglomerative clustering or a combination of any such methods. The goal of the clustering is to group very similar tokens together, so the maximum allowable distance between any two tokens within a cluster is set at a small threshold.

The results of the clustering are sets or classes of token groups organized such that there is a high degree of similarity between all tokens within each class and that the token groups each represent a single material under varying illumination. All tokens found in a specific group as a result of the clustering should represent the same color transition, for example ambient light to 50% incident illumination on a green surface.

In step 214, for each token group determined via the clustering of step 212, the CPU 12 assumes that the tokens represent illumination change in an image for a single material, as predicted by the BIDR model. The CPU 12 estimates the incident or direct illuminant, or assumes the direct illuminant to be white. An estimate of the incident illuminant can be obtained through a white balance algorithm, as typically built into present day, commercially available cameras. Assuming a white incident illuminant, the spectrum will be uniform (1, 1, 1). The CPU 12 can then calculate the material color for the object indicated by the pixels within a group of tokens.

Material color, illuminant and pixel image values are related as follows: Image value=material color*illuminant. Thus pixels in a token group (the token group being a representation of a shadow across a single material, according to the BIDR model of the present invention), provide a basis for correct color determination of a region of consistent reflectance, as exhibited by a single material in the image. An output (step 216) by the CPU 12 is an indication of a material field identified through an analysis of the identified token groups.

FIG. 7 is a flow chart for using linear tokens and BIDR cylinders to identify regions of consistent reflectance of an image, according to a feature of the present invention. In step 218, the CPU 12 is given an image area. In step 220, linear tokens are identified as in steps 100 through 110 (including any of the optional filtering steps 104 through 109) of FIG. 3. With local estimates of the spectral ratio from step 222, the linear tokens optionally can be filtered further in step 224.

In step 226, similar linear tokens are grouped together. For the purpose of clustering, the CPU defines the distance between two linear tokens as d=Euclidean distance between the slopes of two BIDR cylinders+0.5*(distance from cylinder 1 Bright end pixel to cylinder 2 axis+distance from cylinder 1 Dark end pixel to cylinder 2 axis+distance from cylinder 2 Bright end pixel to cylinder 1 axis+distance from cylinder 2 Dark end pixel to cylinder 1 axis)+0.5*(|cylinder 1 bright location−cylinder 2 bright location|+|cylinder 1 dark location+cylinder 2 dark location|). The CPU then executes one of any clustering algorithms well-known in the art such as leader-follower (online) clustering or hierarchical agglomerative clustering or a combination of any such methods. The goal of the clustering is to group very similar linear tokens together, so the maximum allowable distance between any two linear tokens within a cluster is set at a small threshold.

The results of the clustering are sets or classes of linear tokens organized such that there is a high degree of similarity between all linear tokens within each class. All linear tokens found in a specific group as a result of the clustering should represent the same color transition, for example ambient light to 50% incident illumination on a green surface.

In step 228, each group of linear tokens is examined, and the CPU 12 calculates a BIDR cylinder in RGB space that encloses all of the linear tokens in the group. For each group, the linear tokens are used as seed pixels for standard region growing in step 230. Region growing is a technique well known in the art. Regions are grown from the seed pixels with the membership criterion being that additional pixels must lie within the calculated BIDR cylinders.

Next the CPU 12 groups overlapping regions (step 231). If regions have significant overlap, they are likely manifestations of the same material. One linear token group could describe, for instance, the transition from shadowed green with a green ambient light from interreflection to incident-lit green, while another linear token group could describe, for instance, the transition from shadowed green with a blue skylight ambient to incident-lit green. The two regions would describe different illumination transitions on the green material, and they would overlap in the incident lit region. A sufficient overlap for grouping regions can be defined as one region that has, for example, at least 10% of its pixels also in another region.

In step 232, for each group of regions, it is assumed that all variation is due to illumination; that is, the group of regions is all on one material. Each individual region describes some portion of a transition from some ambient color to incident illumination on that material, and a group of overlapping regions provides a detection of a single material under varying illumination conditions with possibly multiple ambient illuminants with different spectra. For each group of regions, the material color can be estimated as the brightest color in the region or as, for example, the color of the pixel with the 95th percentile brightness value. Then, by the simple relationship image color=material color*illumination color, the illumination color across the group of regions can be determined. This results in an illumination field and material field, (step 234).

FIG. 8 is a flow chart for using Nth order tokens to identify shadowed and lit regions of an image, according to a feature of the present invention. In step 300, the CPU 12 is given a uniform token list for an area of an image file 18. A uniform token is a connected region of an image with approximately constant pixel values (for example, within a range determined by the expected noise margin of the recording equipment) throughout the region. The CPU 12 can identify uniform tokens by testing a seed, for example an array of pixels, for consistent pixel value among pixels within the seed, and grow the seed if the seed passes the consistent value test. A more detailed description of uniform token identification is disclosed in the co-pending application Ser. No. 11/341,742, filed on even date herewith, entitled: "Method and System For Identifying Illumination Flux In An Image."

In step 302, a local characteristic spectral ratio is identified by the CPU 12. In step 304, the CPU 12 identifies all neighboring pairs of uniform tokens that match the characteristic spectral ratio. That is, the CPU 12 determines if a pair of pixels, one from each token of the pair, form a spectral ratio, S=D/(B−D) equal to the characteristic spectral ratio. Any such pair of tokens represents a token in shadow and a lit token, and each such pair comprises a $2^{nd}$ order token. In step 306, the CPU 12 creates training sets from the pixels of matching pairs of uniform tokens. The pixels from a token in shadow are labeled (−1) and the pixels from the lit token are labeled (1). Nth order tokens, such as, for example, two $2^{nd}$ order tokens that match one another in a shadow/lit relationship, can be used as a pair.

In step 308, the CPU 12 generates a vector for each pixel of the shadow/lit pair of tokens in a $2^{nd}$ order token. The vector comprises a pixel location, pixel color, and label (−1 or 1). Each vector has six elements: pixel location (x, y), pixel color (r, g, b), and label (−1 or 1). Step 310 can be implemented by any well known function fitting or machine learning algorithm, such as neural networks, support vector machines, or k-nearest-neighbors. The learning algorithm creates a function to output a −1 or 1 depending on the input of x, y, r, g, and b. Thus, for any pixel in the image, these values can be input to the function and a resulting classification will be output. In step 312, the CPU uses the function to classify all the pixels of the image as either shadow or lit, to output a shadow mask (step 314).

FIG. 9 is a flow chart for using ratio labeling to identify and correct shadowed areas of an image, according to a feature of the present invention. In step 316, the CPU 12 is given an image file 18, and a characteristic spectral ratio for the image file 18. In step 318, the CPU 12 identifies all pixels of the image that could be in a shadow. The identification can be implemented by a test of each individual pixel, one at a time, by the CPU 12 to determine whether the subject pixel is dark enough to be in a shadow, for example, at an intensity level lower than 50% of the intensity range of the image. In step 320, for each pixel determined to be dark enough to possibly be in a shadow within the image, the CPU 12 searches a neighboring area of the image, for example, a 30×30 square of pixels around a subject pixel, for any brighter pixel having a spectral ratio with the subject dark pixel, that matches or closely matches the given characteristic spectral ratio for the image area. If there are more than one brighter pixel matches, the CPU 12 can order the set of brighter pixels by the amount of error relative to the characteristic spectral ratio, and by the brightness of the brighter pixels. A best match (closest to the characteristic spectral ratio and brightest pixel) or weighted average of the ordered brighter pixels can be used, together with the corresponding dark pixel, as a ratio label pair.

In step 322, the CPU 12 marks each dark pixel of each ratio label pair as a shadow pixel, and outputs a shadow mask comprising all of the shadow pixels of the image (step 324). Alternatively, in step 326, the CPU 12 can operate to modify each pixel designated as a shadow pixel by changing the color and intensity of the dark pixel to that of the bright pixel in the corresponding ratio label pair. In step 328, the CPU 12 outputs a shadow-free image.

FIG. 10 is a flow chart for identifying illumination gradients in an image, according to a feature of the present invention. An illumination gradient is a relatively small area of an image where a direct or incident illuminant is changing measurably. Examples of areas of an image where illumination gradients exist are the penumbra of a shadow and the curved surface of a cylinder. In step 400, the CPU is given an image file 18, and a set of linear tokens for the image. The linear tokens of the given set can be identified by the CPU 12 through execution of the routine of FIG. 3. In step 402, for each linear token in the linear token list, the CPU 12 grows the linear token by examining pixels adjacent the linear token for similarity to pixels along the RGB cylinder, as in standard region growing.

In step 404, the CPU 12 estimates the Bright and Dark ends of the grown cylinder. Most linear tokens determined by the CPU 12 do not connect a fully lit pixel to a fully dark pixel. As a linear token is grown, in step 402, the extent of the pixels in the region along the line defined by the linear token tends to grow toward lighter and darker ends. By taking the brightest and darkest end pixels of a grown linear token, that tends to overestimate the true length of the cylinder. Thus, the estimate can comprise, for example, the pixel in the grown region with the $90^{th}$ percentile brightness value as the Bright end pixel and with the $10^{th}$ percentile brightness as the Dark end pixel.

Using the Bright and Dark ends as reference points, the CPU selects a portion of the RGB cylinder as a penumbra (step 406). A penumbra is a partial shadow between regions of complete shadow (solely ambient illumination) and full illumination by the incident illuminant. The penumbra is the transitional region between full illumination and ambient illumination. An estimate can be made of the penumbra by setting the length of the grown cylinder as a number in the range [0, 1] and selecting the portion [0.3, 0.7] as the penumbra portion.

In step 408, starting with a pixel within the middle of the selected penumbra of the grown cylinder, the CPU 12 finds all pixels within a connected region that fall within the penumbra. In step 410, the CPU 12 marks all pixels found in the connected area. It is expected in the grown cylinder that the penumbra portion within a grown region can be separated by dark or lit regions. The original seed pixel for finding a connected region within the penumbra is selected from within the original linear token (the middle of the selected penumbra), before being grown. If there are disconnected areas due to separation by dark or lit areas, another linear token tested via steps 402-410 may mark the omitted pixels. In step 412, the CPU 12 labels all pixels with two or more marks, based upon processing of all linear tokens, as an illumination gradient, and outputs information on illumination edges indicated by the illumination gradients (step 414).

FIG. 11 is a flow chart for identifying material edges in an image using illumination gradients, according to a feature of the present invention. Once illumination gradients are identified by the CPU 12 through execution of the routine of FIG. 10, the illumination gradients can be used to identify material edges. As noted above, according to a significant observation of the present invention, an image comprises two components, material and illumination. All changes in an image are caused by one or the other of these components. When one of these is known, the other can be determined. The routine of FIG. 11 utilizes this principle to identify material edges within an image. In step 416, the CPU is given an input image such as an image file 18. In parallel, the CPU 12, in steps 418 and 420 respectively, runs a standard edge detector to identify all edges in the image, and runs the routine of FIG. 11 to identify illumination gradients corresponding to edges of the image due to illumination changes.

In step 422, the illumination gradient information is used as a filter by the CPU 12 to mask out those edges determined by the standard edge detector that are due to illumination changes, by comparing each edge to the illumination gradient information. The result is an output of material edge information (step 424).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for determining an illumination field in an image, comprising the steps of:
a computer executing the following steps:
providing an image file depicting the image, in a computer memory;
automatically identifying linear tokens in the image of the image file by testing each pixel of the image to determine a linear token relationship between the pixel and neighboring pixels in the image, each one of the linear tokens defining a connected region of the image having colors extending as a cylinder in a color space, from a dark end to a light end, along a positive slope and corresponding to a single material depicted in the image, according to a bi-illuminant dichromatic reflection model; and
utilizing the linear tokens to identify an illumination field.

2. The method of claim 1 wherein the step of identifying linear tokens is carried out by testing a local area around a selected pixel to determine the formation of a linear segment forming a cylinder in RGB space.

3. The method of claim 1 wherein the step of identifying linear tokens includes filtering each identified linear token for confirmation each such linear token corresponds to an illumination change in the image.

4. The method of claim 1, wherein the step of utilizing the linear tokens to identify an illumination field is carried out by clustering linear tokens of an image into token groups and calculating a material color for each token group.

5. The method of claim 4 wherein the step of clustering linear tokens of an image into token groups and calculating a material color for each token group is carried out by calculating a BIDR cylinder for a token group.

6. An automated, computerized method for determining a shadow in an image, comprising the steps of:
a computer executing the following steps:
providing an image file depicting the image, in a computer memory;
calculating a characteristic spectral ratio for the image as a function of incident illuminant and ambient illuminant characteristics of the image; and
utilizing the characteristic spectral ratio to identify a shadow in the image by testing shadow candidate pixels of the image in a ratio matching to neighboring pixels of the image relative to the characteristic spectral ratio.

7. The method of claim 6 wherein the step of utilizing the characteristic spectral ratio to identify a shadow in the image is carried out by comparing a spectral ratio for a preselected dark/bright pixel pair to the characteristic spectral ratio for a match.

8. The method of claim 6 wherein the step of utilizing the characteristic spectral ratio to identify a shadow in the image is carried out by comparing a spectral ratio for a preselected token pair to the characteristic spectral ratio for a match.

9. An automated, computerized method for determining a material edge in an image, comprising the steps of:
a computer executing the following steps:
providing an image file depicting the image, in a computer memory;
calculating an illumination gradient for the image as a function of a linear token, the linear token being automatically identified by testing a pixel of the image to determine a linear token relationship between the pixel and neighboring pixels in the image and defining a connected region of the image having colors extending as a cylinder in a color space, from a dark end to a light end, along a positive slope and corresponding to a single material depicted in the image, according to a bi-illuminant dichromatic reflection model; and
utilizing the illumination gradient to identify a material edge in the image.

10. A computer program product, disposed on a non-transitory computer readable media, the product including computer executable process steps operable to control a computer to:
provide an image file depicting the image, in a computer memory;
automatically identify linear tokens in the image of the image file by testing each pixel of the image to determine a linear token relationship between the pixel and neighboring pixels in the image, each one of the linear tokens defining a connected region of the image having colors extending as a cylinder in a color space, from a dark end to a light end, along a positive slope and corresponding to a single material depicted in the image, according to a bi-illuminant dichromatic reflection model; and
utilize the linear tokens to identify an illumination field.

11. A computer program product, disposed on a non-transitory computer readable media, the product including computer executable process steps operable to control a computer to:
provide an image file depicting the image, in a computer memory;
calculate a characteristic spectral ratio for the image as a function of incident illuminant and ambient illuminant characteristics of the image; and
utilize the characteristic spectral ratio to identify a shadow in the image by testing shadow candidate pixels of the image in a ratio matching to neighboring pixels of the image relative to the characteristic spectral ratio.

12. A computer program product, disposed on a non-transitory computer readable media, the product including computer executable process steps operable to control a computer to:
provide an image file depicting the image, in a computer memory;
calculate an illumination gradient for the image as a function of a linear token, the linear token being automatically identified by testing a pixel of the image to determine a linear token relationship between the pixel and neighboring pixels in the image and defining a connected region of the image having colors extending as a cylinder in a color space, from a dark end to a light end, along a positive slope and corresponding to a single material depicted in the image, according to a bi-illuminant dichromatic reflection model; and
utilize the illumination gradient to identify a material edge in the image.

* * * * *